United States Patent [19]

Eckert

[11] Patent Number: 5,788,337
[45] Date of Patent: Aug. 4, 1998

[54] AUXILIARY ENERGY BRAKE SYSTEM OF AUTOMOTIVE VEHICLES

[75] Inventor: Alfred Eckert, Mainz, Germany

[73] Assignee: ITT Automotive Europe GmbH, Frankfurt, Germany

[21] Appl. No.: 553,520

[22] PCT Filed: Mar. 29, 1994

[86] PCT No.: PCT/EP94/00981

§ 371 Date: Nov. 16, 1995

§ 102(e) Date: Nov. 16, 1995

[87] PCT Pub. No.: WO94/23976

PCT Pub. Date: Oct. 27, 1994

[30] Foreign Application Priority Data

Apr. 16, 1993 [DE] Germany ............... 43 12 404.6

[51] Int. Cl.⁶ .................... B60T 13/68; B60T 8/60
[52] U.S. Cl. .................... 303/3; 303/11; 303/DIG. 3
[58] Field of Search .................. 303/3, 10, 11, 303/15, 155, 166, 122.12, 122.13, 123.14, DIG. 3, DIG. 4

[56] References Cited

U.S. PATENT DOCUMENTS

| | | | |
|---|---|---|---|
| 4,572,585 | 2/1986 | Guichard | 303/3 |
| 4,676,558 | 6/1987 | Klein . | |
| 4,930,845 | 6/1990 | Bleckmann et al. . | |
| 5,060,159 | 10/1991 | Fennel . | |
| 5,106,170 | 4/1992 | Matsuda et al. | 303/122.13 |
| 5,154,494 | 10/1992 | Kost et al. | 303/DIG. 4 |
| 5,154,495 | 10/1992 | Volz . | |

FOREIGN PATENT DOCUMENTS

| | | |
|---|---|---|
| 0 226 803 | 7/1987 | European Pat. Off. . |
| 0 265 623 | 5/1988 | European Pat. Off. . |
| 0 410 891 | 1/1991 | European Pat. Off. . |
| 0 438 678 | 7/1991 | European Pat. Off. . |
| 1 961 039 | 6/1971 | Germany . |
| 3 403 236 | 8/1985 | Germany . |
| 3 516 399 | 11/1986 | Germany . |
| 3 526 763 | 2/1987 | Germany . |
| 3 534 022 | 3/1987 | Germany . |
| 3 812 830 | 7/1989 | Germany . |
| 3 809 099 | 9/1989 | Germany . |
| 3 809 100 | 9/1989 | Germany . |
| 3 813 173 | 11/1989 | Germany . |
| 8 916 672 | 11/1990 | Germany . |
| 4 012 167 | 10/1991 | Germany . |
| 4 013 278 | 10/1991 | Germany . |
| 4 029 793 | 3/1992 | Germany . |

OTHER PUBLICATIONS

"Bremstechnische Begriffe und Werte für Nutzfahrzeuge" der Firma Knorr–Bremse GmbH, Ausg. 1976, S.295.

U.S. patent application labelled "P6400".

*Primary Examiner*—Matthew C. Graham
*Attorney, Agent, or Firm*—Thomas N. Twomey; J. Gordon Lewis

[57] ABSTRACT

An auxiliary energy brake system of automotive vehicles has a central pressure source and a hydraulic system which includes pressure medium lines, electrically controllable hydraulic valves, and pressure medium orifices. A pressure sensor is located at the outlet of the pressure source. The braking pressure in the wheel brakes ($P_{Rb}$) is established from the measured values ($P_{meas}$), determined by the pressure sensor, and from the hydraulic conductance (D) of the orifices of the hydraulic system in accordance with formula $$P_{Rb} f(D, P_{meas}).$$

22 Claims, 3 Drawing Sheets

Increase

Decrease

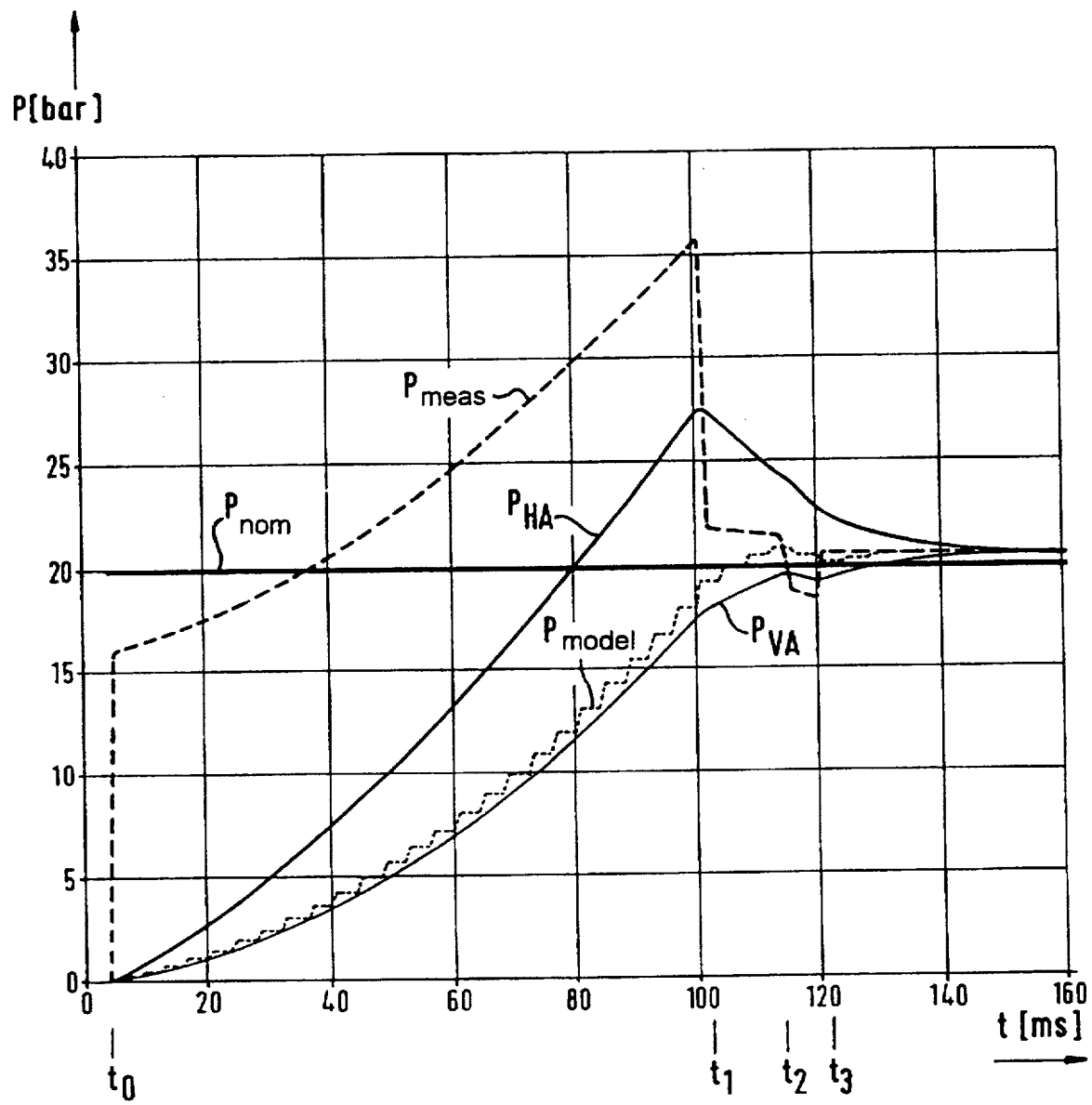

AUXILIARY ENERGY BRAKE SYSTEM OF AUTOMOTIVE VEHICLES

This application is the U.S. national-phase application of PCT International Application No. PCT/EP94/00981.

BACKGROUND OF THE INVENTION

This invention relates to an automotive vehicle auxiliary energy brake system having a central pressure source and a hydraulic system which includes pressure medium lines connecting the wheel brakes of the automotive vehicle with the pressure source, electrically controllable hydraulic valves, and pressure medium orifices. Brake systems of this type also include an electronic control unit for generating valve control signals and for controlling the braking pressure in the wheel brakes in dependence on measured pressure signals and a pressure sensor arranged at the outlet of the pressure source.

On principle, an auxiliary energy brake system of this type will always be needed if a wheel brake is to be activated independently of the actuation of the brake system by the driver. A known example of the application of such a system is traction slip control by brake management. In these systems, the braking pressure is controlled in response to the rotational behavior of the spinning or unstable wheels.

Further, there are brake systems conceivable and being developed which will be activated automatically as an accident-preventing measure as soon as the distance between an automotive vehicle and another vehicle in front of it or another obstacle becomes too small. Speed control systems likewise require brake management in some situations. For such systems, the rotational behavior of the wheels is not a suitable control parameter; intervention by means of control does not depend on the instability of any wheel.

Adjusting a preset braking pressure which is variable or depends on certain conditions is difficult. Control systems are known which work with a fixed pulse pattern and, if necessary, modify this pulse pattern in dependence on reactions of the vehicle. These systems are relatively inaccurate and are only able to effect rough pressure changes. Moreover, there is a relatively strong dependence of the braking pressure on the environmental and operating temperatures.

Besides, there are known control systems which cannot function without direct measurement of the braking pressure in the individual wheel brakes. In these systems, a plurality of pressure sensors is needed, namely at least one sensor per brake caliper which, moreover, must be arranged near the brake caliper.

German Patent DE-A-40 29 793 discloses a vehicular hydraulic brake which comprises a central pressure source and hydraulic valves by means of which both a boosting function and anti-lock control and traction slip control are possible. Moreover, this system provides driving dynamics adaptation within the normal braking range and can even function as a remote controlled brake system. For performing these functions, a hydraulic valve interrupts the pressure medium path from the master cylinder of the brake system to the wheel brakes and switches on the auxiliary pressure source. Then, the pressure at the outlet of the master cylinder, i.e., upstream of this point of separation, and the pressure metered in by the pressure source, i.e., the pressure downstream of the point of separation, are measured by pressure sensors and are evaluated for pressure control or pressure regulation. This requires a considerable expenditure.

SUMMARY OF THE INVENTION

The present invention provides an auxiliary energy brake system which permits continuous adjustment of a preset, variable braking pressure and requires a comparatively small manufacturing expenditure. The brake system displays a stable behavior over a wide operative range and is insensitive to variations in the hydraulic parameters, e.g., caused by temperature changes, aging, wear and tear, or manufacturing tolerances.

A brake system according to the present invention develops braking pressure in the wheel brakes as a function of the pressure at the outlet of a pressure source, measured by a pressure sensor arranged there, and of the hydraulic conductance (D) of the orifices of the hydraulic system.

In order to determine the control parameter (i.e., the braking pressure in the wheel brakes), the inventive auxiliary energy brake system only needs one pressure sensor which is arranged at the outlet of the pressure source. According to the present invention, it is possible to adjust the braking pressure in the wheel brakes to the desired value if the hydraulic conductance between the pressure source and the wheel brakes is known. The hydraulic conductance depends on pressure medium orifices provided in the hydraulic system or is adjustable to a particular value by additional components; the conductance can be computed from the design of the hydraulic system and from the characteristic curves of the valves and of the wheel brakes or can be determined empirically. A brake system according to the present invention is insensitive to the effects of changes in temperature.

Further characteristics, advantages, and applications of this invention will become evident from the following description of this invention, reference being made to the accompanying drawings.

BRIEF DESCRIPTION OF THE DRAWINGS

In the drawings,

FIG. 4 by way of a diagram, shows the pressure variation in the wheel brakes and at the outlet of the central pressure source in accordance with the present invention and with the brake system shown in FIG. 1.

DETAILED DESCRIPTION OF THE INVENTION

Figure 1:
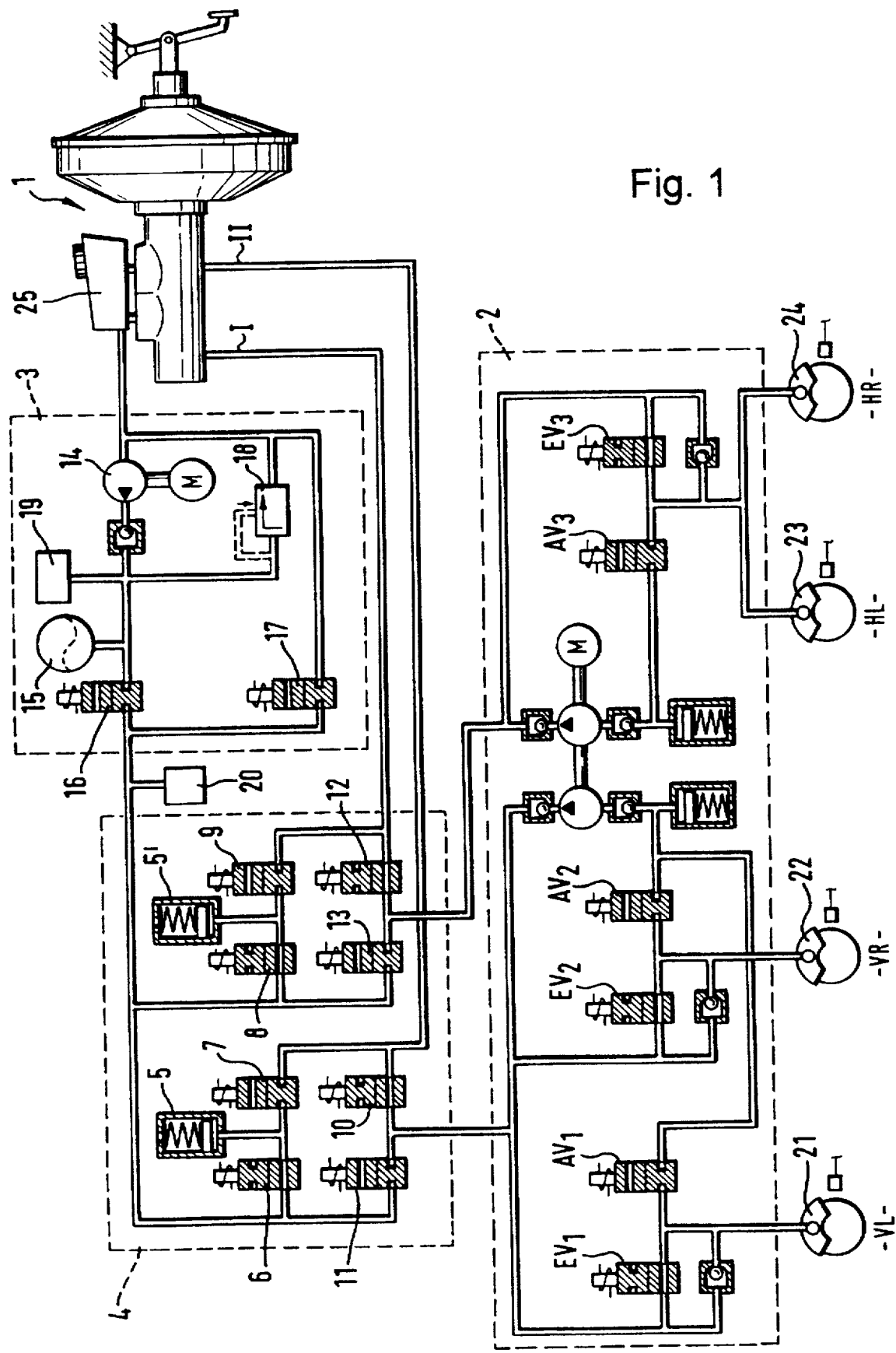
FIG. 1 by way of schematical simplification, shows the main hydraulic components and the hydraulic circuit diagram of an auxiliary energy brake system according to this invention in combination with an anti-lock-controlled brake system.

The brake system shown in FIG. 1 essentially consists of a dual-circuit hydraulic braking pressure generator 1, a complete anti-lock-control valve-and-hydraulic-system unit 2, a central pressure source 3 provided for the auxiliary energy brake system, and an additional valve unit 4 which serves to change over from the application of brake pressure from the pressure generator 1 the auxiliary energy brake system. Moreover, the additional valve unit 4 contains one spring-loaded accumulator 5, 5' per hydraulic circuit I, II.

Together with the appertaining valve pairs 6, 7; 8, 9, each spring-loaded accumulator 5, 5' simulates pedal travel during auxiliary energy brake operation.

In the embodiment according to FIG. 1, a complete separation of the valve/hydraulic-system units 2, 3, 4 is shown for the sake of better understanding. For cost reasons, in practice, a multiple exploitation of individual hydraulic components, i.e., of the valves and of the energy supply, and thus a simplification of the overall hydraulic circuitry, might be preferred.

The pressure source 3 of the inventive auxiliary energy brake system essentially consists of an electric-motor-driven hydraulic pump 14, a hydraulic accumulator 15, and two 2/2 way valves 16, 17 designed as SG-valves which are normally closed. Moreover, a pressure limiting valve 18 and a pressure switch 19 are provided. Pressure switch 19 ensures the maintenance of a preset pressure in the system by switching the pump 14 on and off. Finally, a pressure sensor 20 is arranged at the outlet of pressure source 3. According to this invention, the value of the braking pressure in the individual wheel brakes 21–24 will be computed from the output signals ($P_{meas}$) of this pressure sensor 20.

The hydraulic system of the auxiliary energy brake system of FIG. 1 contains one or several orifices in the path from the central pressure source 3 to the individual wheel brakes 21 through 24, after the switching-over of the "separating valves" 10, 11; 12, 13. These orifices are designed as integral components of the valves 11, 13, $EV_1$–$EV_3$ or as additional (non-represented) discrete components. The total hydraulic conductance of these orifices of each pressure medium path from the pressure source 3 to the respective wheel brake is marked D in the equations listed below; the hydraulic conductance D of the orifices can be computed or can be determined empirically.

Figure 2:
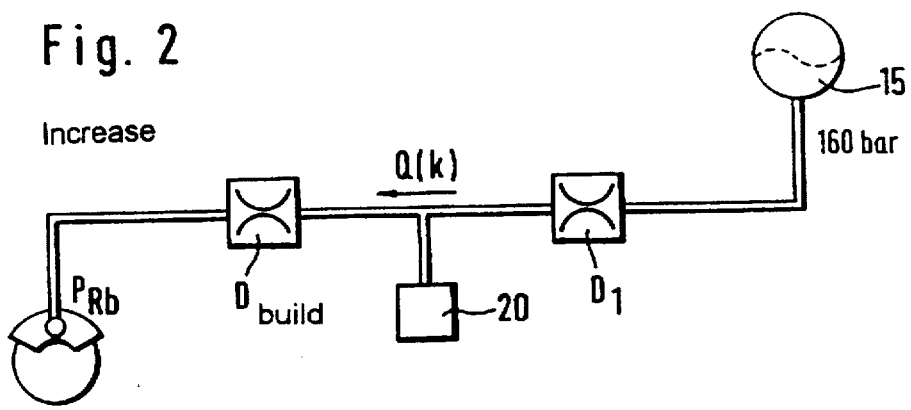
FIG. 2 shows the hydraulic conductance equivalent of the hydraulic system of FIG. 1 with regard to pressure build-up and pressure reduction.
Figure 2:
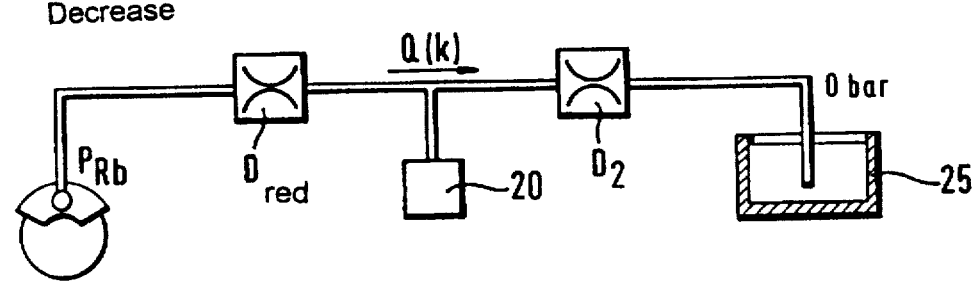

FIG. 2 shows the hydraulic conductance equivalent of the hydraulic system of the inventive auxiliary energy brake system for both the pressure build-up and reduction phases. The orifices $D_{build}$, $D_{red}$ symbolize the hydraulic conductance of the orifices between the pressure source 3 and the wheel brakes 21–24 of the system of FIG. 1 for the pressure build-up ($D_{build}$) and for the pressure reduction ($D_{red}$). The orifices $D_1$, $D_2$ symbolize the hydraulic conductance in the connecting paths to the hydraulic accumulator 15 and the pressure compensation reservoir 25, respectively. The reference numeral of the pressure sensor 20 was selected so as to be the same as that of the corresponding element in the circuitry of FIG. 1. The wheel brake shown in FIG. 2 could be representative of any of the wheel brakes 21 through 24.

Figure 3:
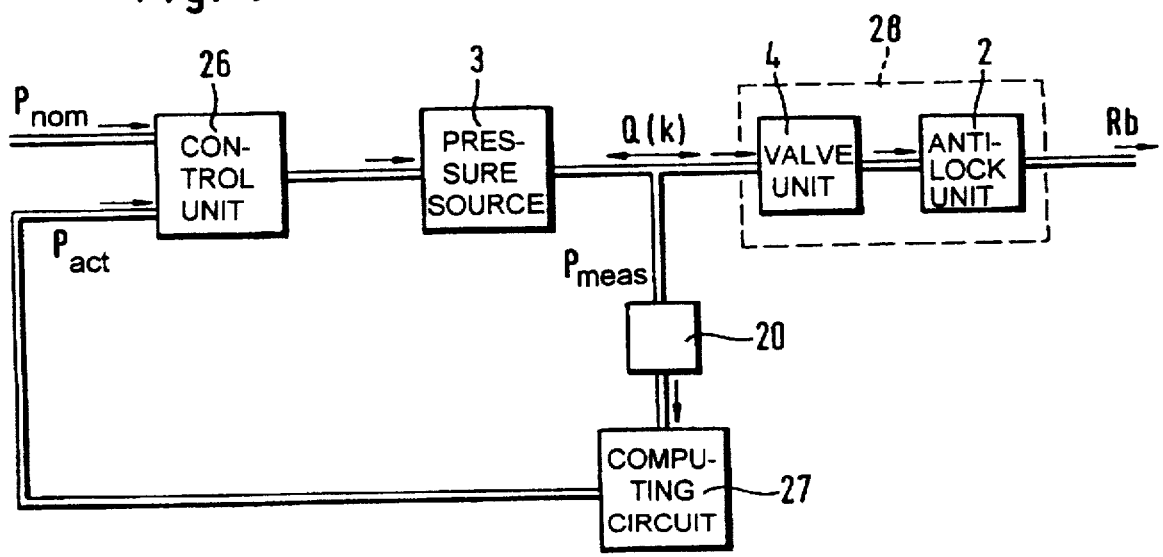
FIG. 3 schematically shows the control circuit of an auxiliary energy brake system according to this invention.

The control circuitry of FIG. 3 illustrates the mode of operation of the auxiliary energy brake system of FIG. 1. An electronic control unit 26 may be an integral component of the electronic system of the anti-lock control system. In a known manner, the nominal pressure $P_{nom}$ is determined and preset for the control unit 26 by a sensor, a potentiometer, or by a digital signal in dependence on the application. This preset nominal value represents the desired braking pressure in the wheel brakes 21 through 24. Typically, the mathematical interrelationship between the preset nominal value $P_{nom}$ and the braking pressure $P_{Rb}$ in the individual wheel brakes 21 through 24 in many events varies in dependence on the respective brake characteristic curve, on the load on the wheel (front wheel or rear wheel) etc. According to this invention, the actual pressure value $P_{act}$ is exclusively determined by measuring and evaluating the pressure $P_{meas}$ at the outlet of the pressure source 3 by means of the pressure sensor 20. This invention utilizes the fact that the pressure in the wheel brakes $P_{Rb}$ is a function of the hydraulic conductance D of the orifice and of the pressure $P_{meas}$ adjusted and measured at the outlet of the pressure source 3. In FIG. 3, the hydraulic system containing the orifice having the hydraulic conductance D is symbolized by a block 28 comprising the two hydraulic units 4 and 2 (see FIG. 1). Connected to unit 2 are the wheel brakes, shown as "Rb" in FIG. 3.

In order to determine the control parameter $P_{Rb}$, i.e., the pressure in the wheel brake, a non-linear state variable reconstruction is performed by means of a computing circuit or "observer" 27 (see FIG. 3). To this end, the following computing steps are carried out recursively:

$$Q(k) = D \sqrt{P_{meas}(k) - P_{Rb}(k-1)} \cdot \text{sign}(P_{meas}(k) - P_{Rb}(k-1))$$

$$v(k) = v(k-1) + T_o \cdot Q(k)$$

$$P_{Rb}(k) = f(v(k)).$$

"Q(k)" is the volume flow rate in the system at the sampling time k. "v(k)" is the pressure medium volume in the wheel brake at the sampling time k. "$P_{Rb}(k)$" is the developed pressure in the wheel brake at the sampling time k. It should be noted that, in the top equation, the absolute value of the square root is calculated to avoid obtaining an "imaginary number." Also, in that equation, the term after the square root is meant to indicate that the sign (positive or negative) of the volume flow rate will be the sign of the measured pressure at time k minus the developed pressure at time k–1. The sign indicates the direction of flow, with a positive sign meaning that flow occurs toward the wheel brakes and a negative sign meaning that flow occurs from the wheel brakes.

Thus, by measuring the pressure $P_{meas}$ upstream of an orifice whose conductance is marked D, the volume flow rate Q(k) is estimated which flows in the system. Then the braking pressure $P_{Rb}$ is determined, with the characteristic curve of the system being taken into account.

This reconstructed (or mathematically developed) wheel braking pressure $P_{Rb}$ forms the actual value $P_{act}$ for the control unit 26 which computes the operating time of the valves 16, 17 (see FIG. 1) of the pressure source 3, in particular of the 2/2 way valve 16 controlling the pressure build-up. The operating time is computed so that the braking pressure will approach or achieve the nominal pressure $P_{nom}$. This computation likewise follows a hydraulic model (cf. FIG. 2) which in mathematical terms is to be described as follows (v again is the pressure medium volume in the wheel brake; $v_o$ is the pressure medium volume at the starting time of the computation):

$$P_{Rb} = av_o + bv_o^2$$

$$P_{nom} = a(v_o + T_v Q) + b(v_o + T_v Q)^2$$

$$P_{nom} - P_{Rb} = a\ T_v Q + b\ T_v^2\ Q^2 + 2b\ T_v Q v_o$$

$$v_o = \frac{\sqrt{a^2 + 4bP_{Rb}} - a}{2b}$$

thus

-continued
$$T_v = \frac{1}{2bQ} \left( \sqrt{a^2 + 4bP_{nom}} - \sqrt{a^2 + 4bP_{Rb}} \right)$$

In these formulas,
a, b are model parameters (i.e., constants) of the wheel brake;
$T_v$ is the sum of the valve operating times;
$P_{nom}$ is the nominal pressure value;
$P_{Rb}$ is the estimated pressure in the brake.

Different hydraulic conductances $D_{build}$, $D_{red}$ of the orifices apply in the pressure build-up phase and in the pressure reduction phase. The difference in the hydraulic conductances is caused by, for instance, the fact that the non-return valves provided in the hydraulic-system unit 2 (see FIG. 1) only act in one direction of the pressure medium flow. Assuming a pressure build-up with a hydraulic conductance $D_{build}$ from a pressure source with $P_{accumulator}$ of 160 bar (see FIG. 2), by approximation, the following equation applies $$Q_{build} = D_{build}\sqrt{P_{accumulator} - P_{Rb}} = D_{build}\sqrt{160 - P_{Rb}}$$

to the volume flow rate Q in the pressure build-up phase.
Correspondingly, the relationship $$Q_{red} = D_{red}\sqrt{P_{Rb}}$$

applies to pressure reduction into a pressureless pressure compensation reservoir 25 (see FIG. 1).

If the result of subtraction of the two roots is greater than 0, a pressure build-up will be initiated. If result is negative, the pressure will be reduced via the valve 17 (see FIG. 1) of the pressure source 3.

The inventive control or regulation of the braking pressure by solely measuring the pressure at the outlet of the pressure source 3, while exploiting the hydraulic conductance D, $D_{build}$, $D_{red}$ of the orifices of the hydraulic system, is characterized by a high-degree stability and independence of temperature influences, aging, variable valve switching times etc. With no pressure measurement taking place at the wheel and thus one sole pressure sensor (20) being required for the overall system, the manufacturing expenditure is relatively small.

Apart from the applications mentioned at the beginning, auxiliary energy brake systems of the inventive type are also suited for driving stability control, for systems where the instruction for actuation is exclusively transmitted electrically (brake-by-wire systems), or for brake systems in electric vehicles.

The aforementioned equations can also be simplified by linearizing the interrelationships which will lead to simplified computer systems, with accuracy being sufficient.
In a linearized system, the following relationship applies:

$$P_{Rb}(k) = F(P_{lin}) \cdot P_{Rb}(k-1) + (1-F(P_{lin})) \cdot P_{meas} + Fak(P_{lin}) \cdot Q_o$$

with F, Qo, Fak being functions of the linearized point of the known pressure-volume characteristic curve of a wheel brake or of a hydraulic system.
There applies $$T_v = K_r(P_{lin}) \cdot (P_{nom} - P_{Rb}),$$

to the linearized control unit, with $$K_r(P_{lin})_{build} = \frac{1}{D_{build}\sqrt{a^2 + 4bP_{lin}} \sqrt{P_{accumulator} - P_{lin}}}$$

for the pressure build-up phase and with $$K_r(P_{lin})_{red} = \frac{1}{D_{red}\sqrt{a^2 + 4bP_{lin}} \sqrt{P_{lin}}}$$

for the pressure reduction phase. $K_r(P_{lin})_{build}$ and $K_r(P_{lin})_{red}$ are referred to as proportional amplification factors of the linearized control unit.

The values of F, Fak, $Q_o$ and $K_r$ can be stored in a table in order to reduce the required number of computing operations.

The variation of the curves of FIG. 4 illustrates the pressure control of the auxiliary energy brake system according to this invention. Illustrated are the pressure $P_{meas}$ measured at the outlet of the pressure source 3, the pressure in the wheel brakes of the rear wheels $P_{HA}$, and the pressure in the wheel brakes of the front wheels $P_{VA}$, as a function of time t. Moreover, the pressure $P_{model}$ established in the computer is outlined stepwise by a dotted line. In the illustrated example, the pressure in the wheels of the rear axle ($P_{HA}$) changes with a considerably greater gradient than the pressure in the wheels of the front axle ($P_{VA}$).

In this simplified example of FIG. 4, a nominal pressure $P_{nom}$ of 20 bar is preset. At time $t_o$, the pressure build-up valve 16, of pressure source 3, is open (see FIG. 1). The control unit (reference numeral 26 in FIG. 3) computes the valve operating times required for achieving the preset nominal pressure. When the "model pressure" $P_{model}$ reaches the value derived from the preset nominal pressure at time $t_1$, the control unit will switch to "pressure keep-up." At time $t_2$, in the course of control, a pressure reduction occurs. Subsequently, the pressures in the rear and front wheel brakes will continue to approach the nominal pressure $P_{nom}$. After time $t_3$, there will be no further valve actuation as the adjusted pressure is within control accuracy. Thus, control is stable and works quite accurately.

I claim:
1. A method for controlling brake pressure in a wheel brake of an automotive vehicle having a brake system including a pressure source and a hydraulic system for connecting said wheel brake with said pressure source, said method comprising the steps of:
   measuring pressure at the outlet of said pressure source to obtain pressure measurements representative of the pressure at the outlet of said pressure source;
   determining a hydraulic conductance between said pressure source and said wheel brake;
   determining, in response to said pressure measurements and to said hydraulic conductance, a value approximating brake pressure in said wheel brake; and
   generating valve control indications, in response to a nominal brake pressure and said value approximating brake pressure in said wheel brake, to control brake pressure in said wheel brake.

2. An auxiliary energy brake system for an automotive vehicle having wheel brakes, said system having a central pressure source; a hydraulic system which comprises: (a) pressure medium lines connecting the wheel brakes of the automotive vehicle with the pressure source, (b) electrically controllable hydraulic valves, and (c) at least one pressure medium orifice having a hydraulic conductance, D; and an electronic control unit for generating valve control signals and for controlling the braking pressure in the wheel brakes in dependence on measured pressure signals, $P_{meas}$, measured by a pressure sensor arranged at the outlet of the pressure source, characterized in that the braking pressure, $P_{Rb}$, in the wheel brakes is established as a function, f, of the measured pressure signals, and of the hydraulic conductance of the at least one orifice of the hydraulic system in accordance with the function $$P_{Rb}=f(D, P_{meas}) \quad (1);$$

and wherein the braking pressure $P_{Rb}(k)$ in the wheel brakes is recursively established in dependence on the hydraulic conductance and on the measured pressure signals, measured at the outlet of the pressure source, as a function of the pressure medium volume, v(k), in the wheel brake in accordance with function $$P_{Rb}(k)=f(v(k)) \quad (2).$$

with $$v(k)=v(k-1)+T_o \cdot Q(k) \quad (3),$$

and $$Q(k)=D\sqrt{\Delta P} \cdot \text{sign}(\Delta P) \quad (4)$$

$$\Delta P=P_{meas}(k)-P_{Rb}(k-1), \quad (5)$$

with Q(k) being the volume flow in the hydraulic system, $T_o$ being the sampling time, and k being the respective sampling step.

3. A brake system as claimed in claim 2, characterized in that the central pressure source comprises a hydraulic pump and electrically switchable multi-directional valves for controlling the pressure medium afflux from the delivery side of the hydraulic pump to the wheel brakes and the pressure medium reflux to the suction side of the hydraulic pump and to a pressure compensation reservoir.

4. A brake system as claimed in claim 3, characterized in that the central pressure source additionally has a hydraulic accumulator.

5. A brake system as claimed in claim 4, characterized in that one 2/2 way valve, blocking in the rest position, each is provided for controlling the pressure medium afflux and the pressure medium reflux.

6. A brake system as claimed in claim 5, characterized in that the pressure medium orifices of the hydraulic system are designed in the form of integral components of the hydraulic valves, located in a pressure medium path from the pressure source to the wheel brakes.

7. A brake system as claimed in claim 5, characterized in that discrete orifices are inserted into the hydraulic system.

8. A brake system as claimed in claim 3, characterized in that the control unit determines the operating time, $T_v$, of the multi-directional valves of the central pressure source in accordance with the relationship $$T_v = \frac{1}{2bQ}(\sqrt{a^2+4bP_{nom}}-\sqrt{a^2+4bP_{Rb}}), \quad (6)$$

with a, b=model parameters or constants of the wheel brake; and

Q=pressure medium volume flow, with $$Q_{build}=D_{build}\sqrt{P_{accumulator}-P_{Rb}}$$

applying to the pressure build-up and $$Q_{red}=D_{red}\sqrt{P_{Rb}}$$

applying to the pressure reduction.

9. A brake system as claimed in claim 3, characterized in that the control unit establishes the braking pressure in the wheel brakes by means of linearized state reconstruction in accordance with equation $$P_{Rb}(k)=F(P_{lin}).P_{Rb}(k-1)+(1-F(P_{lin})).P_{meas}+Fak(P_{lin}).Q_o,$$

with F, Fak, $Q_o$ being functions of the linearization point on the pressure-volume characteristic curve of a wheel brake or of a hydraulic system, and in that the control unit determines the operating times $T_{Vlin}$ of the multi-directional valves in accordance with the relationship $$T_{Vlin}=Kr(P_{lin}).(P_{nom}-P_{Rb}),$$

with the function $$K_r(P_{lin})_{build}=\frac{1}{D_{build}\sqrt{a^2+4bP_{lin}}\sqrt{P_{accumulator}-P_{lin}}}$$

applying to the pressure build-up and with the function $$K_r(P_{lin})_{red}=\frac{1}{D_{red}\sqrt{a^2+4b}\sqrt{P_{lin}}}$$

applying to the pressure reduction, with "lin" meaning "linearized" and $K_r(P_{lin})$ being proportional amplification factors of the linearized control unit and $P_{accumulator}$ being the accumulator pressure.

10. A brake system as claimed in claim 9, characterized in that at least the values of the functions F, Fak, $Q_o$ are stored for the computing process in a table of the control unit in dependence on the variables.

11. A brake system as claimed in claim 10, characterized in that the values of the functions $K_r$ $(P_{lin})_{build}$ and $K_r$ $(P_{lin})_{red}$ applying to the pressure build-up and to the pressure reduction are stored in a table of the control unit in dependence on the variables.

12. An auxiliary energy brake system for an automotive vehicle comprising:

a plurality of wheel brakes;

a central pressure source having an outlet;

a hydraulic system having:
  (a) a plurality of pressure medium lines connecting said wheel brakes with said pressure source,
  (b) a plurality of electrically controllable hydraulic valves arranged in said plurality of pressure medium lines, and
  (c) at least one pressure medium orifice having a hydraulic conductance, D;

a pressure sensor at the outlet of said pressure source for measuring pressure at the outlet of said pressure source to obtain pressure measurements $P_{meas}$ representative of the pressure at the outlet of said pressure source;

means, responsive to said pressure measurements measured by said pressure sensor and to said hydraulic conductance of said at least one pressure medium orifice of said hydraulic system, for determining a value approximating brake pressure in said plurality of wheel brakes; and an electronic control unit, responsive to a nominal brake pressure and said value approximating brake pressure in said plurality of wheel brakes, for generating valve control indications to control brake pressure in said plurality of wheel brakes.

13. A brake system in accordance with claim 12, wherein said means for determining said value approximating said brake pressure include means for recursively calculating said brake pressure in dependence on said hydraulic conductance and on said pressure measurements, as a function of pressure medium volume, v(k), in said plurality of wheel brakes in accordance with the following equations:

$$P_{Rb}(k)=f(v(k)),$$

with $$v(k)=v(k-1)+T_o \cdot Q(k),$$

and $$Q(k) = D \sqrt{\Delta P} \cdot \text{sign}(\Delta P),$$

$$\Delta P = P_{meas}(k) - P_{Rb}(k-1),$$

wherein Q(k) is the volume flow rate in said hydraulic system, $T_o$ is the sampling time, and k is the respective sampling step.

14. A brake system in accordance with claim 12, further comprising a pressure compensation reservoir for supplying pressure fluid and wherein said central pressure source comprises:

a hydraulic pump having a suction side in fluid communication with said pressure compensation reservoir and having a delivery side; and at least one electrically switchable multi-directional valve for controlling pressure medium flow:

(a) from the delivery side of said hydraulic pump to said plurality of pressure medium lines, (b) between said plurality of pressure medium lines and the suction side of said hydraulic pump, and (c) between said plurality of pressure medium lines and said pressure compensation reservoir.

15. A brake system in accordance with claim 14, wherein said central pressure source further comprises a hydraulic accumulator at the delivery side of said hydraulic pump for supplying pressurized pressure fluid.

16. A brake system in accordance with claim 14, wherein said at least one electrically switchable multi-directional valve comprises two 2/2 way valves, which are normally closed.

17. A brake system in accordance with claim 12, wherein said at least one pressure medium orifice is an integral component of at least one of:

said plurality of hydraulic valves, located between said pressure source and said plurality of wheel brakes; and said plurality of pressure medium lines.

18. A brake system in accordance claim 12, further comprising additional orifices inserted into said hydraulic system.

19. A brake system in accordance with claim 14, wherein:

said at least one orifice includes a first orifice having a pressure build-up conductance $D_{build}$ and a second orifice having a pressure reduction conductance $D_{red}$;

said control unit determines an operating time, $T_v$, for which said at least one electrically switchable multi-directional valve remains open to cause the brake pressure of said plurality of wheel brakes to approach a desired nominal brake pressure, in accordance with relationship $$T_v = \frac{1}{2bQ}(\sqrt{a^2 + 4bP_{nom}} - \sqrt{a^2 + 4bP_{Rb}}), \quad (6)$$

wherein a, b=model parameters of said plurality of wheel brakes; and

Q=pressure medium volume flow rate, and $$Q_{build} = D_{build} \sqrt{P_{accumulator} - P_{Rb}}$$

applies to pressure build-up and $$Q_{red} = D_{red} \sqrt{P_{Rb}}$$

applies to pressure reduction.

20. A brake system in accordance with claim 14, wherein:

said at least one orifice includes a first orifice having a pressure build-up conductance $D_{build}$ and a second orifice having a pressure reduction conductance $D_{red}$;

said means for determining said brake pressure include means for calculating a linearized equation as follows:

$$P_{Rb}(k)=F(P_{lin}) \cdot P_{Rb}(k-1)+(1-F(P_{lin})) \cdot P_{meas}+Fak(P_{lin}) \cdot Q_o,$$

wherein F, Fak, $Q_o$ are functions of the linearized point on the pressure-volume characteristic curve of a wheel brake or of a hydraulic system; and said control unit determines the operating times ($T_{Vlin}$) of the multi-directional valves in accordance with relationship $$T_{Vlin}=Kr(P_{lin}) \cdot (P_{nom}-P_{Rb}),$$

with the function $$K_r(P_{lin})_{build} = \frac{1}{D_{build}\sqrt{a^2+4bP_{lin}}\sqrt{P_{accumulator}-P_{lin}}}$$

applying to the pressure build-up and with the function $$K_r(P_{lin})_{red} = \frac{1}{D_{red}\sqrt{a^2+4b}\sqrt{P_{lin}}}$$

applying to the pressure reduction, with "lin" meaning "linearized" and $K_r(P_{lin})$ being proportional amplification factors of the linearized control unit and $P_{accumulator}$ being the accumulator pressure.

21. A brake system in accordance with claim 20, wherein at least the values of the functions F, Fak, $Q_o$ are stored in a table of said control unit.

22. A brake system in accordance claim 20, wherein the values of the functions $K_r(P_{lin})_{build}$ applying to pressure build-up and $K_r(P_{lin})_{red}$ applying to pressure reduction are stored in a table of the control unit (26).

\* \* \* \* \*